(12) United States Patent
Martin

(10) Patent No.: US 9,323,524 B2
(45) Date of Patent: Apr. 26, 2016

(54) SHIFT INSTRUCTION WITH PER-ELEMENT SHIFT COUNTS AND FULL-WIDTH SOURCES

(71) Applicant: Oracle International Corporation, Redwood Shores, CA (US)

(72) Inventor: Albert Martin, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 409 days.

(21) Appl. No.: 14/027,890

(22) Filed: Sep. 16, 2013

(65) Prior Publication Data

US 2015/0082010 A1    Mar. 19, 2015

(51) Int. Cl.
*G06F 9/30*        (2006.01)

(52) U.S. Cl.
CPC ........ *G06F 9/30036* (2013.01); *G06F 9/30018* (2013.01)

(58) Field of Classification Search
CPC .......................... G06F 9/30036; G06F 9/30018
See application file for complete search history.

(56) References Cited

U.S. PATENT DOCUMENTS

| | | | | | |
|---|---|---|---|---|---|
| 3,911,405 | A | * | 10/1975 | Sipple | G06F 9/30018 712/300 |
| 5,941,938 | A | * | 8/1999 | Thayer | G06F 7/5095 708/490 |
| 2004/0030863 | A1 | * | 2/2004 | Paver | G06F 9/30014 712/34 |
| 2012/0254592 | A1 | * | 10/2012 | San Adrian | G06F 9/30043 712/205 |

OTHER PUBLICATIONS

Hilewitz, Y., Lee, R.B., "Fast Bit Gather, Bit Scatter and Bit Permutation Instructions for Commodity Microprocessors", Journal of Signal Processing Systems, vol. 53, dated Nov. 2008, 25 pages.

* cited by examiner

*Primary Examiner* — Farley Abad
(74) *Attorney, Agent, or Firm* — Hickman Palermo Becker Bingham LLP; Daniel D. Ledesma

(57) ABSTRACT

Techniques for packing and unpacking data from a source register using a particular shift instruction are provided. The shift instructions takes, as input, a source register that contains a plurality of elements and a shift count register that contains a plurality of shift counts. Each shift count indicates how much to shift bits from the source registers. Where "source" bits are shifted (or copied) to in an output register depends on the position of the shift count in the shift count register. The shift counts may correspond to one or more bytes from the source register. The shift instruction may initiate a left shift operation or a right shift operation.

25 Claims, 10 Drawing Sheets

SHIFT INSTRUCTION WITH PER-ELEMENT SHIFT COUNTS AND FULL-WIDTH SOURCES

FIELD OF THE DISCLOSURE

The present disclosure generally relates to SIMD instructions and, more particularly, to a SIMD shift instruction that allows each element in a single vector to be associated with a different shift count.

BACKGROUND

A common operation in computing systems is to "pack" data or "unpack" already-packed data. For example, 4-byte data elements may have a lot of unused high order bits. To conserve space, the data elements may be "packed" by removing a certain number (e.g., 12) high order bits from each data element and storing the result in volatile or non-volatile storage. Later, the packed data may be "unpacked" by adding extra bits to each data element to allow instructions that require 4-byte data elements to be executed.

One approach for dealing with packed data involves a dedicated hardware engine or "coprocessor." However, co-processor solutions require significant overhead in controlling the co-processor's actions and gathering its results. Furthermore, co-processor solutions are limited (hard-coded) in how they can be used. Multiple copies of co-processor hardware are needed in modern, highly-threaded CPU designs.

Another approach for dealing with packed data involves instruction-level solutions, such as "parallel deposit" and "parallel extract". Relative to co-processor solutions, current instruction-level solutions have less overhead, use relatively less logic, and offer more flexibility. However, current instruction-level solutions require separate hardware structures, a significant amount of control logic, and do not extend well when dealing with data widths larger than 64 bits.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
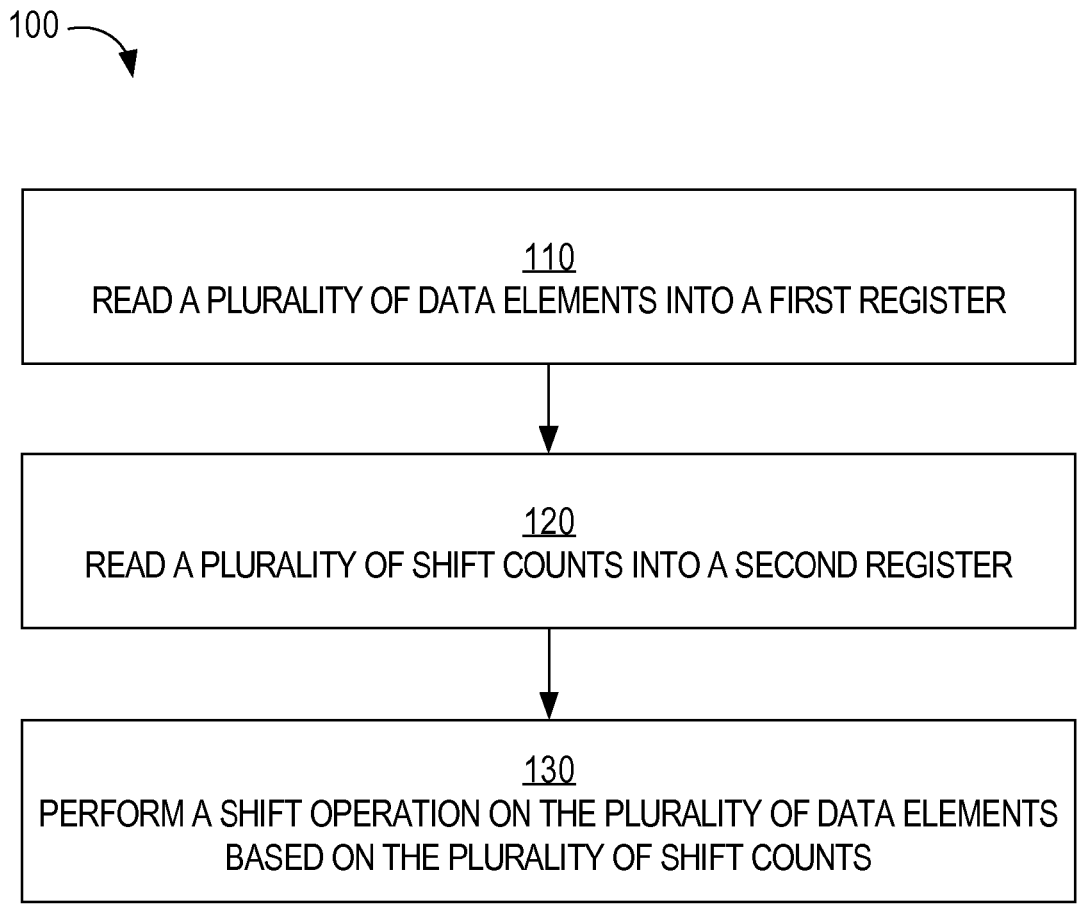
FIG. 1 is a flow diagram that depicts a process for shifting data elements, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for performing a shift instruction that, when executed, causes a shift operation to be performed. The shift operation shifts multiple data elements from a first input register based on respective shift counts stored in a second input register. Each shift count in the second input register is associated with a different slot or position in an output register. The bits for each output element in the output register may come from anywhere in the first input register. A result of the shift operation is stored in the output register and, eventually, in memory and/or in persistent storage. The shift instruction is designed to operate simultaneously on multiple data elements from the first input register. Thus, the shift instruction is a SIMD (single instruction, multiple data) instruction.

SIMD Instructions

A SIMD instruction is an instruction that, when processed, causes a SIMD operation to be performed on multiple distinct data values instead of a single data value. A SIMD operation is implemented in hardware and may take one or more machine cycles to execute. One approach for implementing a SIMD operation is to use one or more registers that are each capable of storing multiple distinct data values. Such registers are referred to herein as SIMD registers. For example, if a SIMD register is capable of storing 128 bits and data elements (e.g., integers) are 32 bits in size, then the SIMD register is capable of storing 128/32=4 distinct data elements. The positions within a SIMD register are referred to as slots. If a SIMD register is capable of storing 4 distinct data elements, then the SIMD register has four slots.

In contrast, if a register is only capable of storing one data value or if only one data value can be operated on at a time, then potentially four times as many hardware instructions would need to be performed relative to a computer system that includes SIMD registers.

A computer system that supports both SIMD and non-SIMD instructions may include multiple SIMD registers and multiple non-SIMD registers. The SIMD registers may be on a different hardware element (e.g., coprocessor) than the hardware element on which the non-SIMD registers reside.

Shift Instruction with Per-Element Shift Counts

A typical shift instruction takes a single shift count as input, which is applied to each of one or more elements in a source or input register. In an embodiment, a shift instruction takes, as input, a source register containing a plurality of data elements and a shift count register containing a plurality of shift counts and shifts, for each output element in an output register, source bits indicated by the shift count in the shift count register that corresponds to the output element. The shift instruction effectively uses an entire source vector as an element source, allowing bits from anywhere in a source register to be shifted into a particular output element. The shift count for a particular slot of an output register is specified in the corresponding slot of the shift count register. Because each output element has its own shift count, it is possible for a source bit to show up in multiple result elements, or in none of them. There is no restriction regarding bit overlaps or missing bits in the result of the shift instruction. In contrast, a typical shift instruction is designed such that each slot in an output register is limited to the bits in a corresponding slot in a source register. If source bits are shifted to the right in the output, then the left-most "shifted in" bits in the output will be 0 s. Similarly, if source bits are shifted to the left in the output, then the right-most "shifted in" bits in the output will be 0 s.

The size of each shift count in a shift count register depends on the size of the output data elements. If each output data element is a single byte, then the shift count register contains a set of byte-wide shift counts. Similarly, if each output data element is two bytes, then the shift count register contains a set of 16-bit wide shift counts.

In an embodiment, the shift instruction is configured to construct output elements that are on 1-byte, 2-byte ("halfword"), 4-byte ("word"), and/or 8-byte ("extended word") boundaries. In a related embodiment, the shift instruction is configured to construct output elements that are on a different byte boundary or an arbitrary n-bit boundary.

Example Process

FIG. 1 is a flow diagram that depicts a process 100 for shifting data elements, in an embodiment. Process 100 involves a new shift instruction that, when executed, takes contents of two registers as input and stores a result of a shift operation in an output register. The contents of a first input register are multiple data elements. A data element may represent virtually any data type, including an integer, a string, or a date and may be of any size, such as two bytes or five bits. The contents of a second input register are multiple shift counts, one for each data element in the output register.

At block 110, a plurality of data elements from a source are read into a first input register (also referred to as the "source" register). Block 110 may be performed by executing a software instruction to read data elements from the source. The source comprises a series of data elements that may be stored in memory and/or in persistent storage.

In a first scenario, the series of data elements from the source are "unpacked" data elements that are to be "packed." This first scenario is referred to herein as the "packing" scenario. For example, an "unpacked" data element may be a 1-byte element that begins with five zero bits. A packing process is performed on the data element where the first five bits are removed to generate a "packed" version of the data element, which consists of three bits.

In a second scenario, the series of data elements from the source are "packed" data elements that are to be "unpacked." This second scenario is referred to herein as the "unpacking" scenario. A "packed" data element is one that has been reduced by removing one or more bits from an "unpacked" version of the data element. For example, a "packed" data element may be a 3-bit element where fives zeros were removed from the "unpacked" version to generate a "packed" version of the data element. In the unpacking scenario, embodiments are not limited to any particular technique for originally packing the data elements. In an embodiment where process 100 involves unpacking, the "packed" data elements were packed by a different computer system relative to the computer system that unpacks the data elements.

At block 120, a plurality of shift counts are read into a second input (or "shift count") register. Each shift count corresponds to a different output data element and dictates how much to shift bits from the first input (or "source") register into the corresponding output data element.

Different shift counts in the shift count register may have different shift counts or the same shift count. For example, a first shift count in the shift count register may be '5' (indicating five bits) while a second shift count in the shift count register may be '10' (indicating ten bits). As another example, two or more shift counts in the shift count register may be '5' (indicating five bits).

At block 130, a shift operation is performed on the plurality of data elements based on the plurality of shift counts. The shift operation is performed by executing a new shift instruction that, when executed, takes the contents of the source register and the shift count register as input and stores a result of the shift operation in an output register. The shift operation considers the shift counts in the shift count register in determining how much to shift source bits from the source register. Specifically, the position of a shift count in the shift count register along with the actual value of shift count (e.g., '5') indicates which set of source bits is to be shifted into the corresponding position of an output register. For example, for 32-bit registers where there are four shift counts in a register (and, thus, 1-byte output elements), a first shift count of '5' indicates that certain contents of the source register are to be shifted right five bits, namely that source bits 0-2 will be in the first output element (corresponding to bits 0-7 in the output register), and five zero bits will be to the left of source bits 0-2 in the first output element. If the second shift count is ten, then source bits 0 (i.e., 8-10, but there is no such thing as a bit at a negative position) through 5 (i.e., 15-10) will be in the second output element (corresponding to bits 8-15 in the output register) and two zero bits will be to the left of the source bits 0-5 in the second output element. If the third shift count is 13, then source 3-10 bits will be in the third output element (corresponding to bits 16-23 in the output register). If the fourth shift count is 18, then source bits 6 (i.e., 24-18) through 13 (i.e., 31-18) will be in the fourth output element (corresponding to bits 24-31 in the output register).

In an embodiment, there are at least two versions of the shift instruction: one version shifts a data element to the right and another version that shifts a data element to the left. The scenario in which process 100 is implemented (whether the "unpacking" scenario or the "packing" scenario) may dictate which version of the shift instruction to employ. Also, the way in which data elements are stored in a register may dictate which shift instruction to employ. For example, while a big-endian processor would use a left shift instruction to "unpack" source data, a little-endian processor would use a right shift instruction to "unpack" source data.

Fixed Width Example

Figure 2:
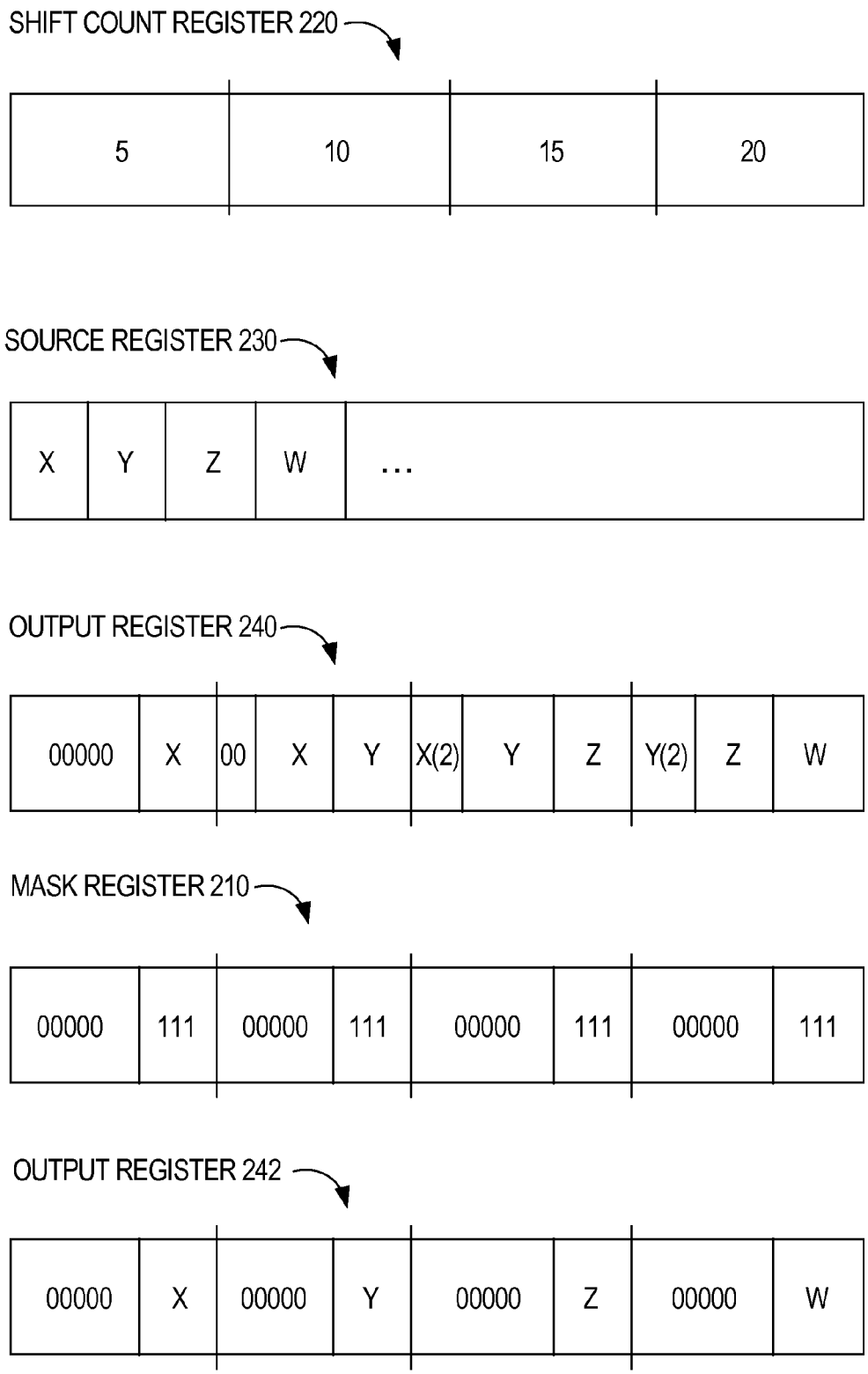
FIG. 2 is a block diagram that depicts an example of shifting fixed-width elements from a source register during an unpacking process, in an embodiment.

In an embodiment, each packed data element from a source is of the same size or width. For example, each packed data element may consist of three bits. FIG. 2 is a block diagram that depicts an example of shifting elements from a register during an unpacking process, in an embodiment. In this example, registers are 32 bits. However, embodiments are applicable to registers of other sizes, such as 64-bit registers, 128-bit registers, 256-bit registers, and 1024-bit registers.

FIG. 2 will be described in conjunction with FIG. 3, which is a flow diagram that depicts a process 300 for unpacking data elements of a fixed width, in an embodiment.

At block 310, mask data is loaded into a mask register 210. The mask data is based on the fixed width. In the example of FIG. 2, the fixed width is three bits and "unpacked" data elements are one byte (i.e., eight bits); thus, the contents of mask register 210 include, for each slot (corresponding to each eventual unpacked data element) in mask register 210, five zero bits followed by three one bits. As another example, if the fixed width is six bits and "unpacked" data elements are two bytes (i.e., 16 bits), then, if mask register 210 is a 32-bit register, the contents for each of the two slots of mask register 210 may include ten zero bits followed by six one bits.

Because the packed data elements have a fixed width, block 310 only needs to be performed once in order to unpack all the data elements from a particular source.

At block 320, shift counts are loaded into a shift count register 220. The shift counts may have been calculated using software code that, when executed, determines the shift counts based on the fixed width and the size of an unpacked data element. In the example of FIG. 2, the four shift counts in shift count register 220 are '5', '10', '15', and '20.' Each shift count corresponds to a different data element in a source register 230.

Again, because the packed data elements have a fixed width, block 320 only needs to be performed once in order to unpack all the data elements from a particular source.

At block 330, a number of data elements from a source (e.g., volatile memory, such as RAM or a cache) are loaded into source register 230. Because source register 230 is a 32-bit register and the fixed width of the data elements is three bits, source register 230 may fit 10 data elements and, optionally, two bits of another data element, the rest of which may be loaded into source register 230 later. In the depicted example, source register 230 stores at least data elements 'x', 'y', 'z', and 'w'.

Although depicted and described in a particular order, blocks 310-330 may be performed in a different order relative to each other.

At block 340, a shift operation is performed based on the contents of shift count register 220 and source register 230. The shift operation is initiated by executing a shift instruction that indicates both registers 220 and 230. A result of performing the shift operation is stored in output register 240, which may originally contain all zeros. As FIG. 2 illustrates, the 'x' data element in output register 240 is shifted five bits (as indicated by the first shift count in shift count register 220) relative to its position in source register 230. Also, the 'y' data element in output register 240 is shifted ten bits (as indicated by the second shift count in shift count register 220) relative to its position in source register 230.

In the depicted example, the shift operation copies over a certain number of bits (to the left of each data element) from source register 230 and stores those bits in the certain "slot" within output register 240. In this example, because "unpacked" data elements are one byte in size, then the shift operation copies over one byte of continuous data from source register 230. In this example, when moving element 'y' to output register 240, element 'x' is also moved to output register 240. Similarly, when moving element 'z' to output register 240, element 'y' and a portion of element 'x' are also moved to output register 240.

At block 350, the mask reflected in mask register 210 is applied to the contents of output register 240. The result of applying the mask may be stored in output register 242 or output register 240. Applying the mask effectively removes, for each shifted data element, data from other data elements from source register 230. In the depicted example, the mask removes: (1) the 'x' element from the second slot in output register 240; (2) the 'y' element and the portion of the 'x' element from the third slot in output register 240; and (3) the 'z' element and the portion of the 'y' element from the fourth slot in output register 240. For example, after moving packed data elements 'x', 'y', 'z', and 'w' from source register 230 to output register 240, the contents of output register 240 are "ANDed" with the contents of mask register 210. A result of this "masking" effectively removes, from output register 240, information of other data elements from source register 230. For example, moving packed data element 'y' from source register 230 to output register 240 also moves packed data element 'x' from source register 230 to output register 240.

Block 350 may also comprise storing the contents of output register 240 in memory, whether volatile or non-volatile, before output register 242 is used again to store the result of another shift operation.

At block 360, the contents of source register 230 are shifted to remove elements 'x', 'y', 'z', and 'w' from source register 230. Shifting the contents of source register 230 causes data elements that immediately follow data element 'w' to be shifted to the "beginning" of source register 230. In the depicted example, because each data element that was unpacked was three bits and there were four data elements, then block 360 involves shifting the twelve bits (i.e., 3*4) that correspond to elements 'x', 'y', 'z', and 'w' out of source register 230. The shift operation in block 360 may be initiated by executing a shift instruction that indicates '12' as the amount of the shift.

While the depicted example illustrates that the shifting of input data elements in block 360 is to the left, other embodiments may involve shifting the input data elements in block 360 to the right. These other embodiments may also involve the shift operation of block 340 being a left shift operation instead of a right shift operation as depicted in FIG. 2.

Figure 3:
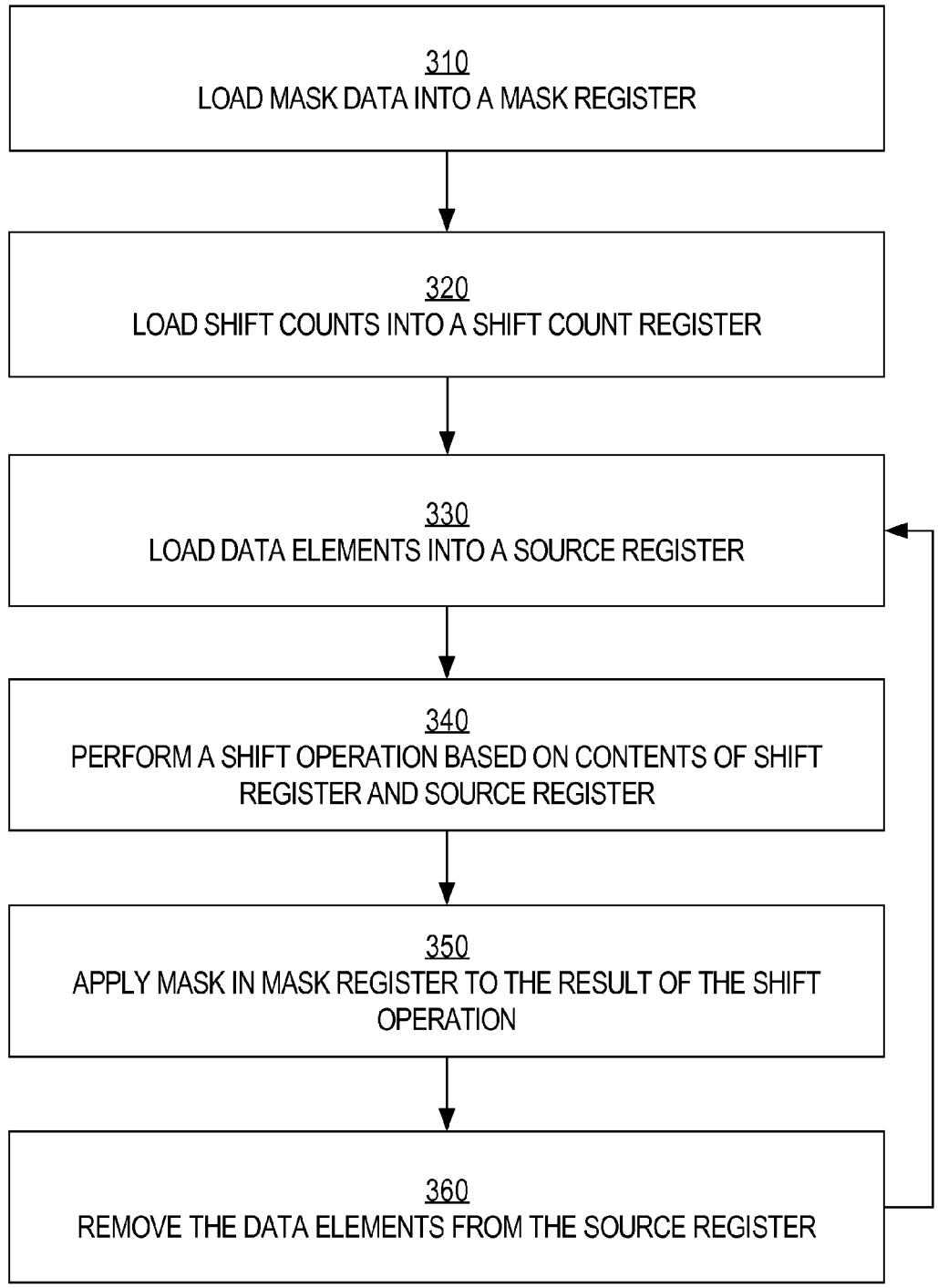
FIG. 3 is a flow diagram that depicts a process for unpacking data elements of a fixed width, in an embodiment.

As depicted in FIG. 3, process 300 proceeds to block 330. In other words, additional "packed" data elements are loaded from the source (indicated in block 330) into source register 230. This loading may occur after each removal of data elements from source register 230 if there are additional "packed" data elements to process. Alternatively, this loading of additional "packed" data elements may occur only if there are not enough packed data elements already in source register 230. For example, after data elements 'x', 'y', 'z', and 'w' are removed from source register 230 and there are four or more other packed data elements in source register 230, then loading additional packed data elements from the source into source register 230 is not necessary and may be delayed until there are fewer than four data elements in source register 230. Thus, block 360 may involve determining whether the number of packed data elements in source register 230 is equal to the number of unpacked data elements that may be stored simultaneously in output register 240. If so, then process 300 proceeds from block 360 to block 340 (instead of to block 330). If not, then process 300 proceeds from block 360 to block 330 where additional packed data elements from the source are loaded into source register 230 (if there are additional packed data elements from the source).

If there are additional data elements in source register 230 that have yet to be unpacked, then process 300 proceeds to block 340.

Variable Width Example

Figure 4:
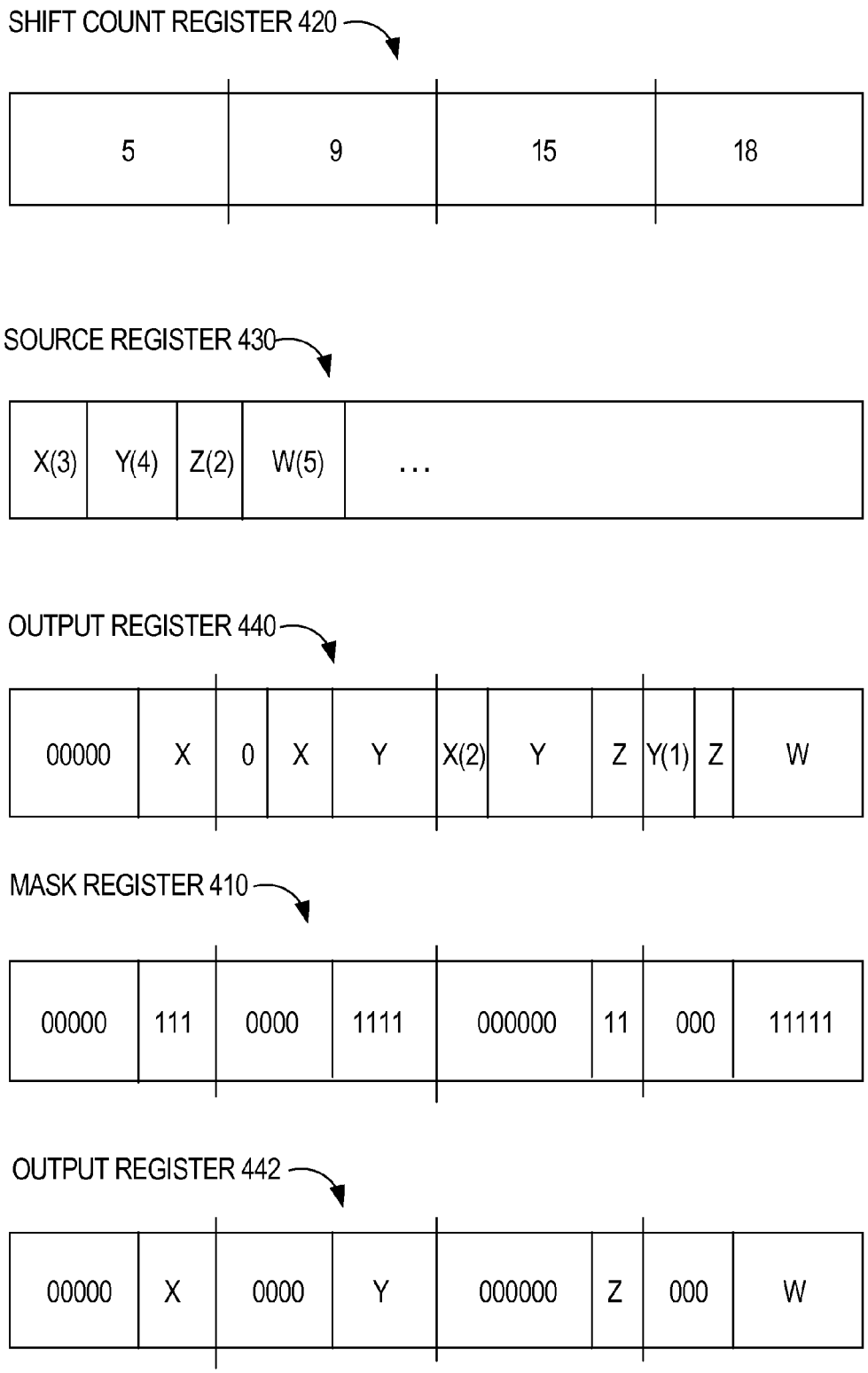
FIG. 4 is a block diagram that depicts an example of shifting variable-width elements from a source register during an unpacking process, in an embodiment.

In an embodiment, packed data elements may have variable width. For example, one packed data element may be three bits and another packed data element may be five bits. FIG. 4 is a block diagram that depicts an example of shifting variable width data elements during an unpacking process, in an embodiment. Again, in this example, registers are 32 bits. However, embodiments are applicable to registers of other sizes, such as 64-bit registers, 128-bit registers, 256-bit registers, and 1024-bit registers.

Figure 5:
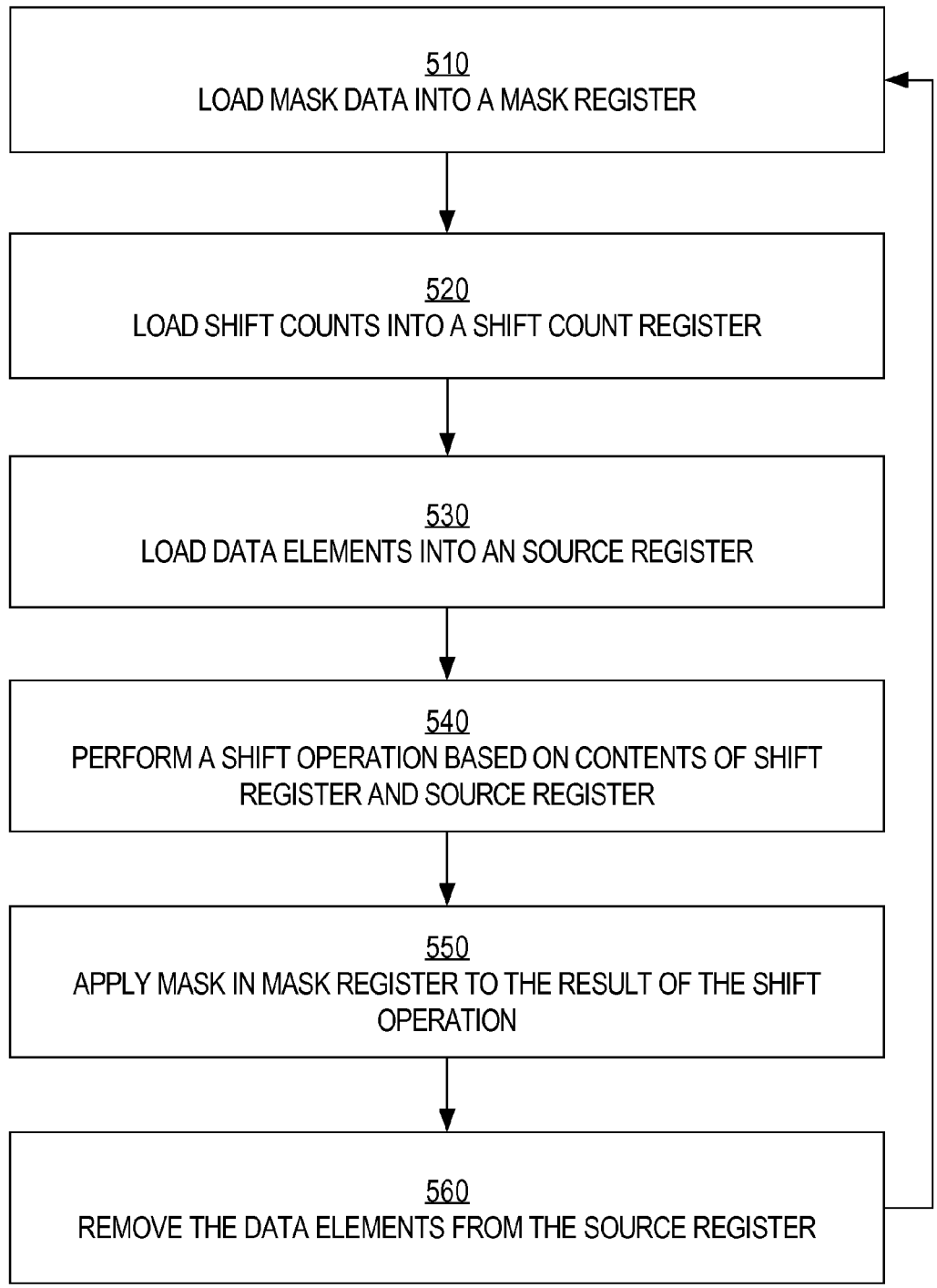
FIG. 5 is a flow diagram that depicts a process for unpacking data elements of a variable width, in an embodiment.

FIG. 4 will be described in conjunction with FIG. 5, which is a flow diagram that depicts a process 500 for unpacking variable width data elements, in an embodiment.

At block 510, mask data is loaded into a mask register 410. The mask data is based on the widths of each data element in source register 430. In the example of FIG. 4, the widths of the four "packed" data elements are three, four, two, and five, respectively (as indicated by the parentheses). Thus, the contents of mask register 410 include: for the first slot corresponding to an eventual unpacked data element, five zero bits followed by three one bits; for the second slot corresponding to an eventual unpacked data element, four zero bits followed by four one bits; for the third slot corresponding to an eventual unpacked data element, six zero bits followed by two one bits; and for the fourth slot corresponding to an eventual unpacked data element, three zero bits followed by five one bits.

Because the packed data elements have variable width, block 510 may need to be performed multiple times in order to unpack all the data elements from a particular source. In fact, block 510 may need to be performed for each pass through process 500.

At block 520, shift counts are loaded into a shift count register 420. The shift counts may have been calculated using software code that, when executed, determines the shift counts based on the variable width and the size of an unpacked data element. In the example of FIG. 4, the four shift counts in shift count register 420 are '5', '9', '15', and '18.' Each shift count corresponds to a different data element in a source register 430. The determination of each shift count for data element i may be calculated as follows: i*(Size_Unpacked)−Sum_Widths$_i$, where i is an integer greater than 0, "Size_Unpacked" is the size (in bits) of unpacked data elements, and Sum_Widths$_i$ is the sum (in bits) of the sizes of the packed data elements from position 1 to i. Thus, the shift count for data element 'w' in FIG. 4 is 4*8−(3+4+2+5)=32−14=18.

At block 530, a number of data elements from a source (e.g., volatile memory, such as RAM or a cache) are loaded into source register 430. In the depicted example, source register 430 stores at least data elements 'x', 'y', 'z', and 'w'.

Although depicted and described in a particular order, blocks 510-530 may be performed in a different order relative to each other. Additionally, block 510 may be performed after block 540, which is described as follows.

At block 540, a shift operation is performed based on the contents of shift count register 420 and source register 430. The shift operation is initiated by executing a shift instruction that indicates both registers 420 and 430. A result of performing the shift operation is stored in output register 440, which may originally contain all zeros. As FIG. 4 illustrates, the 'x' data element in output register 440 is shifted five bits (as indicated by the first shift count in shift count register 420) relative to its position in source register 430. Also, the 'y' data element in output register 440 is shifted nine bits (as indicated by the second shift count in shift count register 420) relative to its position in source register 430.

In the depicted example, the shift operation copies over a certain number of bits (to the left of each data element) from source register 430 and stores those bits in a certain "slot" within output register 440. In this example, because "unpacked" data elements are one byte in size, then the shift operation copies over one byte of continuous data from source register 430. In this example, when moving element 'y' to output register 440, element 'x' is also moved to output register 440. Similarly, when moving element 'z' to output register 440, element 'y' and a portion of element 'x' are also moved to output register 440.

At block 550, the mask reflected in mask register 410 is applied to the contents of output register 440. The result of applying the mask may be stored in output register 442 or output register 440. Applying the mask effectively removes, for each shifted data element in output register 440, data from other data elements from source register 430. In the depicted example, the mask removes: (1) the 'x' element from the second slot in output register 440; (2) the 'y' element and the portion of the 'x' element from the third slot in output register 440; and (3) the 'z' element and the portion of the 'y' element from the fourth slot in output register 440.

Block 550 may also comprise storing the contents of output register 442 in memory, whether volatile or non-volatile, before output register 442 is used again to store the result of another shift operation.

At block 560, the contents of source register 430 are shifted to remove elements 'x', 'y', 'z', and 'w' from source register 430. Shifting the contents of source register 430 causes data elements that immediately follow data element 'w' to be shifted to the "beginning" of source register 430. The size of the shift involved in block 560 depends on the sum of the sizes of the packed data elements in source register 430 that were just "unpacked." In this example, the sum of the sizes of elements 'x', 'y', 'z', and 'w' is 14, referring to 14 bits. Thus, a shift instruction that, when executed, causes the shift operation of block 560 to be performed may specify '14.'

As noted previously, while the depicted example illustrates that the shifting of input data elements in block 560 is to the left, other embodiments may involve shifting the input data elements in block 560 to the right. These other embodiments may also involve the shift operation of block 540 being a left shift operation instead of a right shift operation as depicted in FIG. 4.

Process 500 returns to block 510 to load a different set of mask data into mask register 510 and/or to block 520 to load a different set of shift counts into shift count register 510. This is because the next set of packed data elements (i.e., after data element 'w') are likely to have different permutation of bit widths relative to data elements 'x', 'y', 'z', and 'w.'

In an embodiment, a subsequent pass or iteration of block 530 involves loading "packed" data elements from the source (indicated in block 530) into source register 430. This loading may occur after each removal of data elements from source register 430 if there are additional "packed" data elements to process. Alternatively, this loading of additional "packed" data elements may occur only if there are not enough packed data elements already in source register 430. For example, after data elements 'x', 'y', 'z', and 'w' are removed from source register 430 and there are four or more other packed data elements in source register 430, then loading additional packed data elements from the source into source register 430 is not necessary and may be delayed until there are fewer than four data elements in source register 430. Thus, block 560 may involve determining whether the number of packed data elements in source register 430 is equal to the number of unpacked data elements that may be stored simultaneously in output register 440. If not, then additional packed data elements from the source are loaded into source register 430 (if there are additional packed data elements from the source).

Packing Process

The following example is an example of how the shift instruction disclosed herein may be used to pack data elements.

Figure 6A:
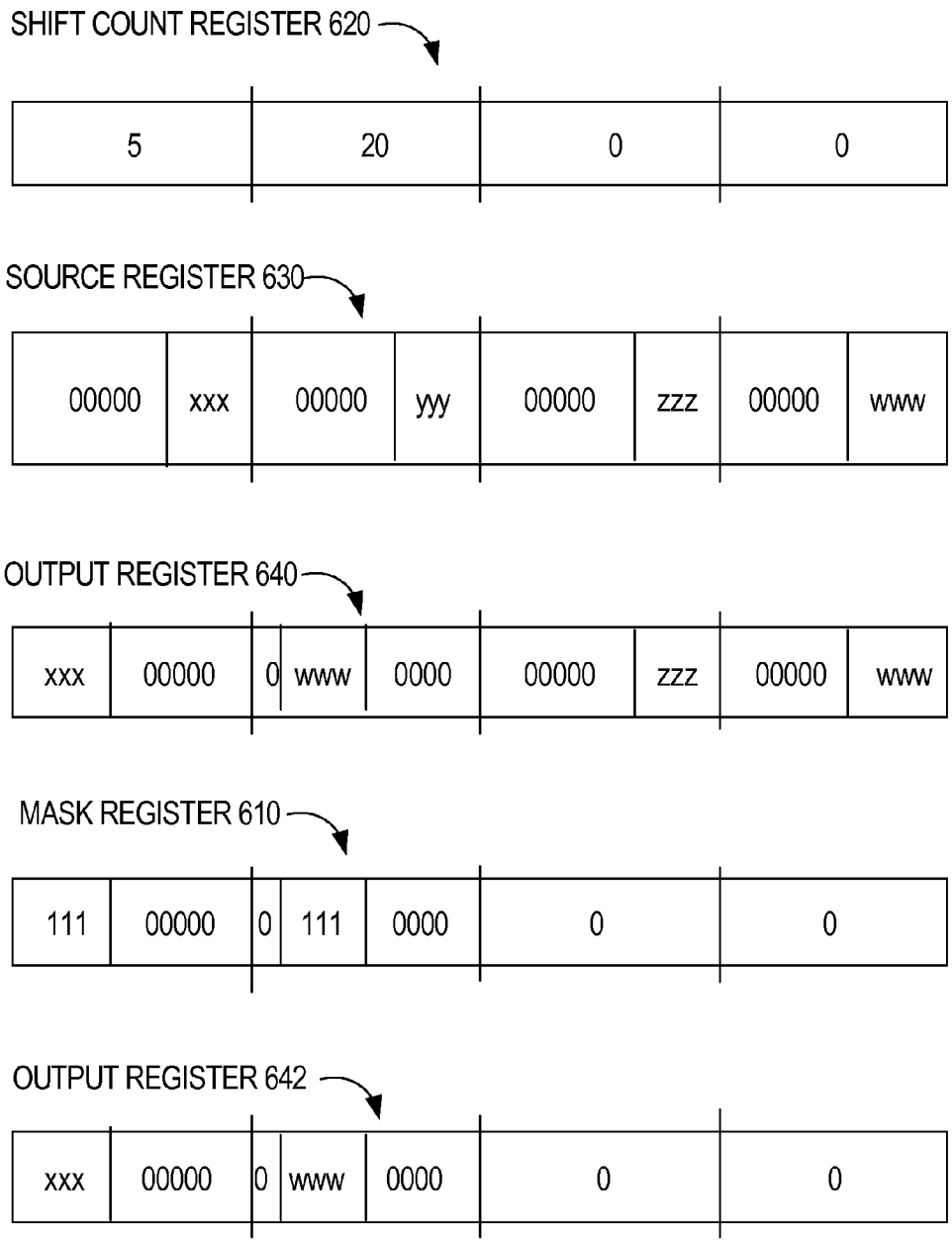
FIGS. 6A-6C are block diagrams that depict an example of shifting elements from a source register during a packing process, in an embodiment.
Figure 6B:
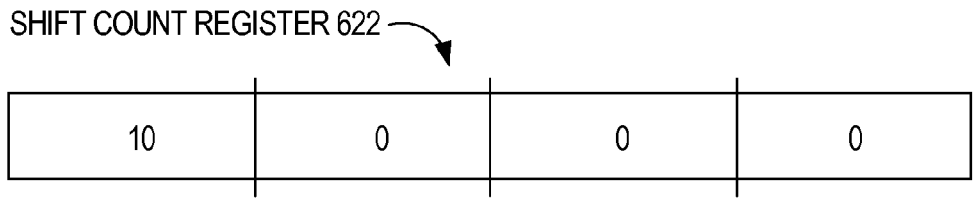
Figure 6B:
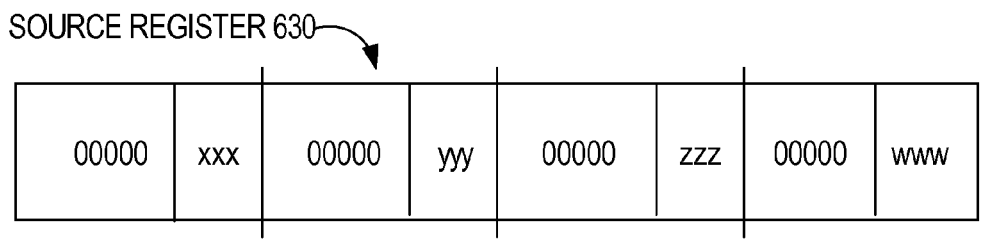
Figure 6B:
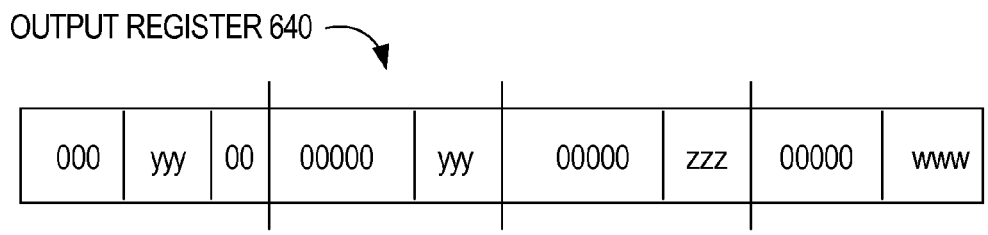
Figure 6B:
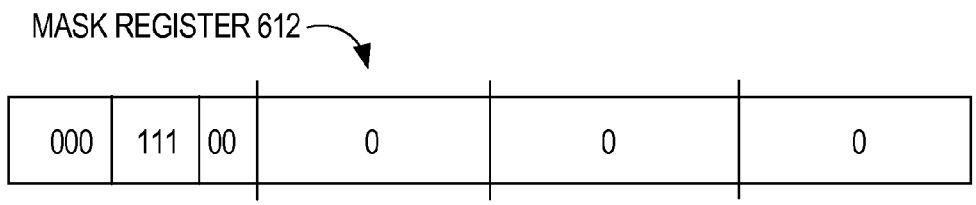
Figure 6B:
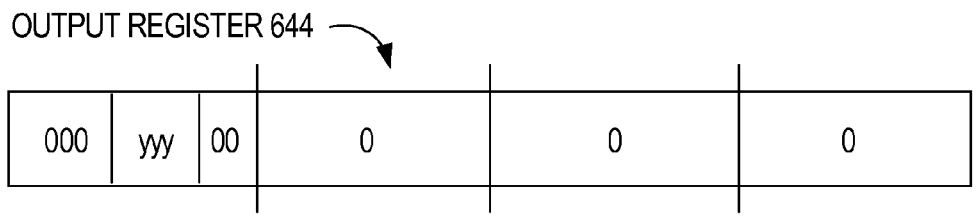
Figure 6B:
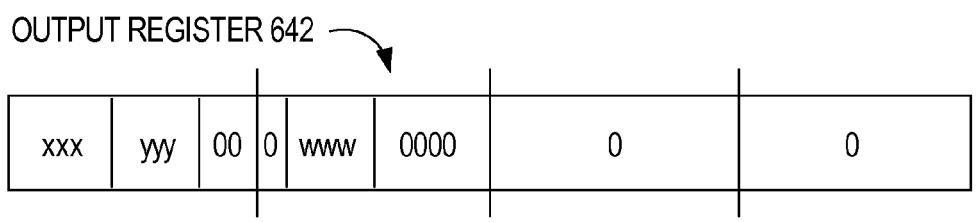
Figure 6C:

In an embodiment, each unpacked data element from a source is of the same size or width. FIGS. 6A-6C are block diagrams that depict an example of shifting data elements from a register during a packing process, in an embodiment. In this example, registers are 32 bits. However, embodiments are applicable to registers of other sizes, such as 64-bit registers, 128-bit registers, 256-bit registers, and 1024-bit registers.

Figure 7:
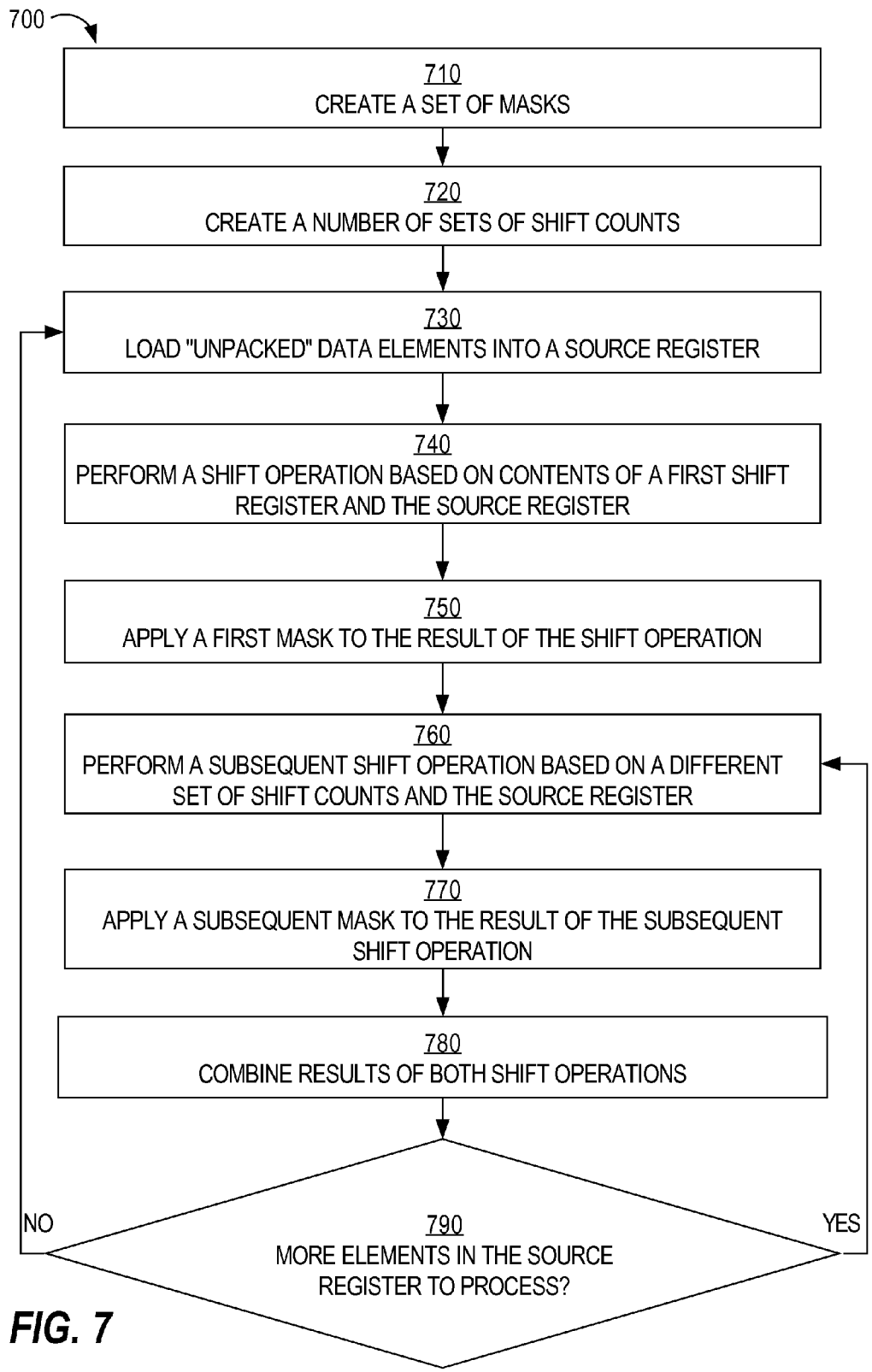
FIG. 7 is a flow diagram that depicts a process for packing data elements, in an embodiment.

FIGS. 6A-6C will be described in conjunction with FIG. 7, which is a flow diagram that depicts a process 700 for packing data elements of a fixed width, in an embodiment.

At block 710, a number of masks are created. The number of masks that are created depends on the number of full or partial packed elements that can fit within a single element of an output register. For example, if unpacked elements are 8 bits wide, then the number of passes/masks required may be:

| Minimum Element Width | Number of Passes/Masks |
| --- | --- |
| 1 | 8 (8 ÷ 1) |
| 2 | 4 (8 ÷ 2) |
| 3 | 3 (8 ÷ 3) |
| 4-7 | 2 (8 ÷ 4) |
| 8 | 1 (8 ÷ 8) |

The cases where the minimum element width are "1" bit wide and "8" bits wide can be dealt with using different methods; thus, only considering the 2-7 bit cases may be sufficient. Unpacked elements that are larger than 1 byte can be dealt with similarly.

In the depicted example, source register 630 can store four unpacked data elements, each of which being one byte in size. Thus, block 710 may involve creating three masks. Each mask may be stored in a different register. Alternatively, a mask is loaded into a mask register (e.g., mask register 610) when needed.

A reason why a single mask will not suffice is because shifting multiple unpacked data elements into a single output register to create an equal number of multiple packed data elements would cause data from one or more of the data elements to be overwritten or lost. For example, if unpacked data elements 'x' and 'y' in source register 630 are shifted into an output register 640 based on a single shift register 620, then, once element 'x' has been shifted into output register 640, shifting element 'y' into output register 640 would cause 'x' to be overwritten with zeros.

Another reason why a single mask will not suffice is because a particular slot or element position in output register 640 will contain more than one packed data element, and each corresponding unpacked data element requires a different shift amount for a particular slot. Each pass (involving blocks 740-750) uses a separate shift count (and separate mask) to gather all of the packed data elements together in a single slot or element position. In the depicted example, x, y, and (part of) z need shift counts of 5, 10, and 15 to shift from source register 630 into the first slot of output register 640.

Each mask is based on the fixed width of the eventual unpacked data elements. In the example of FIGS. 6A-6C, the fixed width is three bits; thus, the contents of mask register 610 include three one bits in the first slot (e.g., corresponding to packed element 'x'), three one bits in the second slot (e.g., corresponding to packed element 'w'), and zeros in all the other bits. The contents of mask register 612 (or mask register 610 when different mask data is loaded therein) may be three zero bits, followed by three one bits (e.g., corresponding to packed element 'y'), followed by 26 zero bits. (A single '0' in a slot of a register indicates all zeros in that slot.)

Because the packed data elements have a fixed width, block 710 may only be performed once in order to unpack all the data elements from a particular source.

At block 720, a number of shift counts are determined. The shift counts may have been calculated using software code that, when executed, determines the shift counts based on the fixed width and the size of an unpacked data element. In the example of FIGS. 6A-6C, three different shift count registers are populated: shift count register 620 stores a shift count for the first data element in source register 630 and the fourth data element in source register 630; shift count register 622 stores a shift count for the second data element in source register 630; and shift count register 624 stores a shift count for one portion of the third element in source register 630 and a shift count for another portion of the third element in source register 630. This is because the third element straddles the first and second slots of output register 640. The shift counts are, respectively, '5', '10', '15', and '20.' Alternatively, instead of using three different shift count registers, a single shift count register 620 is used and is loaded with the appropriate shift count(s) when the shift count(s) are needed. The "unused" slots in each shift count register may have a zero or other value. If the "unused" shift counts have a zero value, then, for each unused slot, when the shift instruction is executed, the data from source register 630 is simply copied over to the corresponding slot in output register 640.

Again, because the packed data elements have a fixed width, block 720 only needs to be performed once in order to unpack all the data elements from a particular source.

At block 730, a number of unpacked data elements from a source (e.g., volatile memory, such as RAM or a cache) are loaded into source register 630. Because source register 630 is a 32-bit register and the width of each data elements is one byte, source register 630 may store four data elements. In the depicted example, source register 630 stores at least the unpacked versions of data elements 'x', 'y', 'z', and 'w'.

Although depicted and described in a particular order, blocks 710-730 may be performed in a different order relative to each other.

At block 740, a shift operation is performed based on the contents of shift count register 620 and source register 630. The shift operation is initiated by executing a shift instruction that indicates both registers 620 and 630. A result of performing the shift operation is stored in output register 640, which may originally contain all zeros. As FIG. 6A illustrates, the 'x' data element in output register 640 is shifted five bits (as indicated by the first shift count in shift count register 620) relative to its position in source register 630 and the 'w' data element in output register 640 is shifted 20 bits relative to its position in source register 630.

At block 750, any unwanted data from output register 640 is masked. The result of the masking may be stored in output register 642 (or output register 640). For example, after moving unpacked data element 'x' from source register 630 to output register 640, the contents of output register 640 are "ANDed" with the contents of mask register 610. A result of this "masking" effectively removes, from output register 640, information of other data elements from source register 630. For example, moving unpacked data element 'x' from source register 630 to output register 640 also moves unpacked data element 'z' from source register 630 to output register 640. However, data element 'z' remains "unpacked" in output register 640 because shift count register 620 did not contain a shift count for data element 'z'.

At block 760, using another shift instruction, a next set of unpacked data elements are moved from source register 630 to output register 640 based on the contents of shift count register 622. For example, unpacked 'y' data element in source register 630 is moved to output register 640. Thus, the packed version of data element 'y' in output register 640 is shifted ten bits relative to its position in source register 630. The ten bits is indicated in shift count register 622, which may be the same as shift count register 620 with newly (relative to shift count register 620 in FIG. 6A) loaded data.

In the depicted example, the shift operation copies over a certain number of bits (to the left of each data element) from source register 630 and stores those bits in the certain slot within an output register. In this example, because "unpacked" data elements are one byte in size, the shift operation copies over one byte of continuous data from source register 630. In this example, when moving element 'y' to output register 640, elements 'y', 'z', and 'w' are also moved to output register 640.

At block 770, any wanted data from output register 640 is masked and the result of the masking is stored in output register 644 (or output register 640). For example, after moving unpacked data element 'y' from source register 630 to output register 640, the contents of output register 640 are "ANDed" (e.g., using an AND instruction) with the contents of mask register 612 (or mask register 610 with contents that are different than the contents of mask register 610 in FIG. 6A). A result of this "masking" effectively removes, from output register 640, information of other data elements from source register 630. For example, moving unpacked data element 'y' from source register 630 to output register 640 also moves unpacked data element 'z' from source register 630 to output register 640. However, data element 'z' remains "unpacked" in output register 640 because shift count register 622 did not contain a shift count for data element 'z'. A result of this masking may be stored in output register 644 or another output register, such as register 640.

At block 780, the contents of output register 644 and output register 642 of FIG. 6B are combined. In the example of FIG. 6A-6B, before block 780 is performed the first time, a packed version of data element 'x' is reflected in output register 642 and a packed version of data element 'y' is reflected in output register 644. Block 780 may be performed by "ORing" the contents of output register 644 with the contents of output register 642. A result of block 780 may be stored in output register 642 (as indicated FIG. 6B) or another register.

At block 790, it is determined whether there are more data elements in source register 630 to pack. This may be determined based on the number of times the shift instruction or the AND instruction (i.e. part of the masking process) has been executed. In the example of FIG. 6A-6C, if the shift instruction has been performed three times, then all the data elements in source register 630 have been packed and process 700 may proceed to block 730, where a new set of unpacked data elements are loaded into source register 630.

If the determination of block 790 is positive, then process 700 proceeds to block 760 where a next set of unpacked data elements are moved from source register 630 to an output register (e.g., output register 640 may be reused if output register 642 is used to store the intermediate results of the packing process, as FIG. 6B indicates). For example, after packing data element 'y', data element 'z' is packed by shifting data element 'z' from source register 630 to output register 640 based on contents of shift count register 624 (which may be the same as shift count register 620 or 622) (see FIG. 6C). Because data element 'z' straddles across two elements in result register 640, the shift count of '15' should be specified in the corresponding two elements in shift count register 624.

After a second iteration (or performance) of block 760, a second iteration of block 770 is performed, where the contents of output register 640 are masked with the contents of mask register 614 (which may be the same as mask register 610 or 612). A result of block 770 may be stored in, for example, output register 644, as FIG. 6C indicates.

After a second iteration of block 770, a second iteration of block 780 is performed, where the contents of output register 644 (which may store the intermediate results) of FIG. 6C are combined (e.g., "OR'ed") with the contents of output register 642 of FIG. 6B. Given the example of FIGS. 6A-6C, the contents of output register 642 should contain at least packed versions of data elements 'x', 'y', 'z', and 'w'.

Process 700 proceeds from block 780 to block 790 again to determine where there are additional data elements in source register 630 to pack. In the depicted example, all the unpacked data elements in source register 630 have been packed in output register 642. Thus, process 700 would return to block 730.

Process 700 may end once all the unpacked data elements from the source are packed.

In an embodiment, the packing process needs to allow for packed data elements to have variable width. For example, one packed data element may need to be three bits and another packed data element may need to be five bits. The process for packing data elements is similar to the approach described above for packing data elements to have a fixed width. One difference (which is similar to the variable width unpacking approach described above with respect to FIGS. 4-5) is that after a set of unpacked data elements from a source register are packed, a new set of masks and a new set of shift counts need to be created to account for the new set of variable widths of the next set of unpacked data elements to process.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
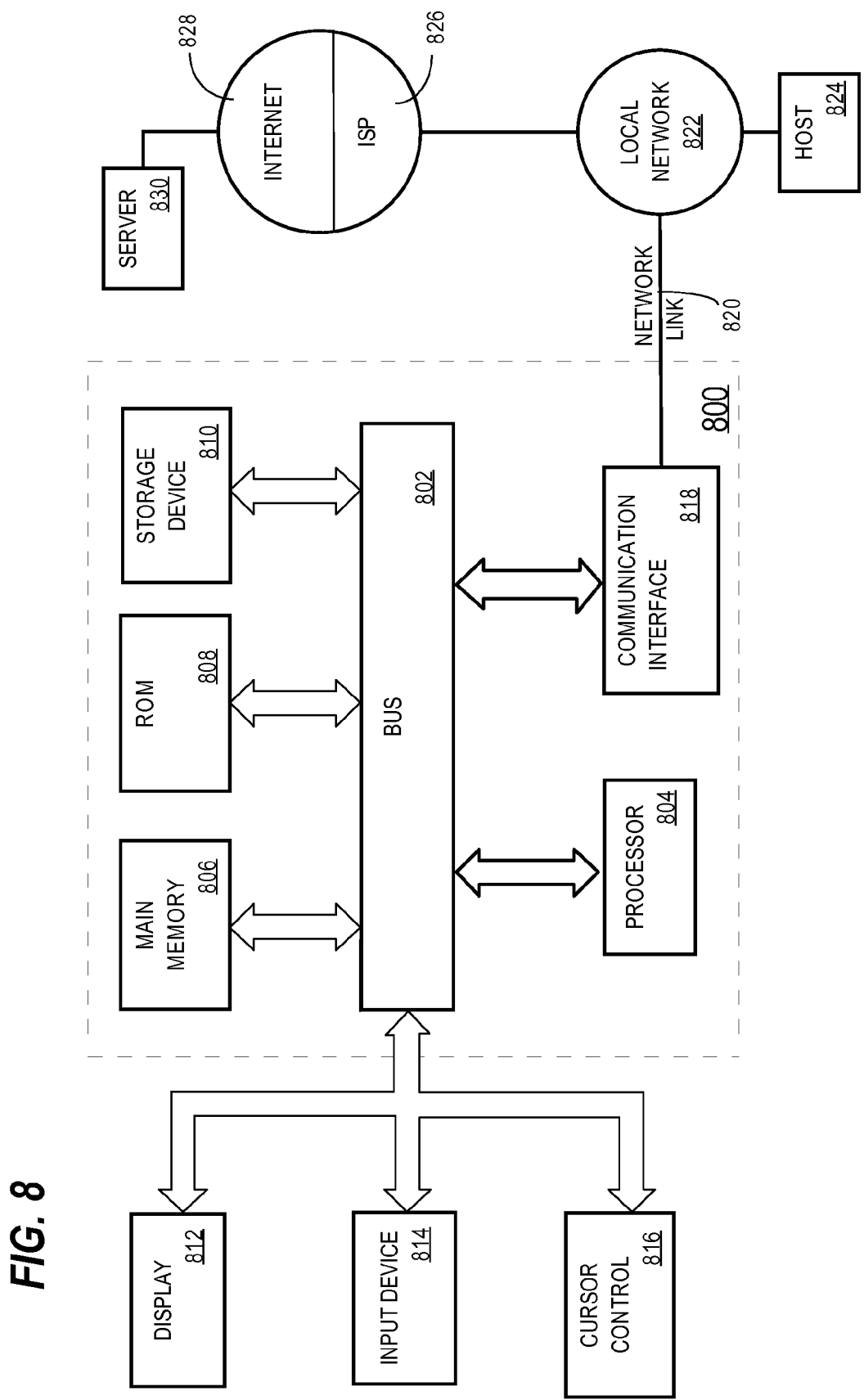
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing a plurality of source elements in a source register;
    storing, in a shift count register, a plurality of shift counts, each of which corresponds to a set of bits in an output register;
    executing a shift instruction that takes, as input, contents of the source register and contents of the shift count register;

wherein executing the shift instruction causes:
  identifying, in the shift count register, a first shift count that corresponds to a first slot of a plurality of slots in the output register;
  identifying a first set of bits in the source register based on the first shift count and a first position, within the source register, that corresponds to the first slot of the plurality of slots in the output register;
  moving the first set of bits into the first slot of the plurality of slots in the output register;
  identifying, in the shift count register, a second shift count that corresponds to a second slot of the plurality of slots in the output register, wherein the second slot is different than the first slot;
  identifying a second set of bits in the source register based on the second shift count and a second position, within the source register, that corresponds to the second slot of the plurality of slots in the output register, wherein the second set of bits is different than the first set of bits;
  moving the second set of bits into the second slot of the plurality of slots in the output register.

2. The method of claim 1, wherein:
the plurality of source elements in the source register are packed versions of unpacked data elements in the output register;
each output element in the output register is larger in size than a corresponding element of the plurality of source elements.

3. The method of claim 1, wherein:
each source element of the plurality of source elements in the source register is of a particular size;
each output element in the output register is smaller than the particular size.

4. The method of claim 1, further comprising:
storing mask data in a mask register;
after executing the shift instruction, executing an AND instruction that (a) takes, as input, contents of the output register and contents of the mask register (b) and causes a result of execution of the AND instruction to be stored in a second output register;
causing the result to be stored in memory.

5. The method of claim 1, wherein the plurality of source elements are from an input source that includes a set of elements, each of which is of a same particular size.

6. The method of claim 5, wherein the plurality of source elements are a first plurality of source elements, wherein executing the shift instruction is performed at a first time, the method further comprising, after executing the shift instruction:
  storing, in a second source register, a second plurality of source elements that are from the input source and that are different than the first plurality of source elements;
  after storing the second plurality of source elements in the second source register, executing, at a second time that is after the first time, the shift instruction that takes, as input, contents of the second source register and contents of the shift count register;
  wherein the contents of the shift count register at the second time are the same as the contents of the shift count register at the first time;
  wherein executing the shift instruction at the second time causes, for each slot of a second plurality of slots in a second output register:
    identifying, in the shift count register, a certain shift count that corresponds to said each slot of the second plurality of slots;
    identifying a second set of bits in the second source register based on the certain shift count and a certain position, within the second source register, that corresponds to said each slot of the second plurality of slots;
    moving the second set of bits from the second source register into said each slot of the second plurality of slots.

7. The method of claim 1, wherein a first element of the plurality of source elements and a second element of the plurality of source elements are on different non-byte boundaries.

8. The method of claim 7, wherein the plurality of shift counts are a first plurality of shift counts and the plurality of source elements are a first plurality of source elements, wherein executing the shift instruction is performed at a first time, the method further comprising, after executing the shift instruction:
  storing, in a second shift count register, a second plurality of shift counts that are different than the first plurality of shift counts;
  storing, in a second source register, a second plurality of source elements that are different than the first plurality of source elements;
  after storing the second plurality of source elements in the second source register, executing the shift instruction at a second time;
  wherein executing the shift instruction at the second time causes, for each slot of a second plurality of slots in a second output register:
    identifying, in the second shift count register, a certain shift count that corresponds to said slot of the second plurality of slots;
    identifying a second set of bits in the second source register based on the certain shift count and a certain position, within the second source register, that corresponds to said each slot of the second plurality of slots;
    moving the second set of bits from the second source register into said each slot of the second plurality of slots.

9. The method of claim 8, further comprising:
storing first mask data in a first mask register;
after executing the shift instruction at the first time, executing, at a third time, an AND instruction that takes, as input, contents of the output register and the first mask register;
wherein the output register includes a first plurality of shifted elements, each of which corresponds to a different element of the first plurality of source elements;
wherein executing the AND instruction at the third time causes the first mask data to be applied to the first plurality of shifted elements;
storing, in a second mask register, second mask data that is different than the first mask data;
after executing the shift instruction at the second time, executing, at a fourth time that is after the third time, the AND instruction, which takes, as input, contents of the second output register and contents of the second mask register;
wherein the second output register includes a second plurality of shifted elements, each of which corresponds to a different element of the second plurality of source elements;
wherein executing the AND instruction at the fourth time causes the second mask data to be applied to the second plurality of shifted elements.

10. One or more storage media storing instructions which, when executed by one or more processors, cause:
   storing a plurality of source elements in a source register;
   storing, in a shift count register, a plurality of shift counts, each of which corresponds to a set of bits in an output register;
   executing a shift instruction that takes, as input, contents of the source register and contents of the shift count register;
   wherein executing the shift instruction causes:
      identifying, in the shift count register, a first shift count that corresponds to a first slot of a plurality of slots in the output register;
      identifying a first set of bits in the source register based on the first shift count and a first position, within the source register, that corresponds to the first slot of the plurality of slots in the output register;
      moving the first set of bits into the first slot of the plurality of slots in the output register;
      identifying, in the shift count register, a second shift count that corresponds to a second slot of the plurality of slots in the output register, wherein the second slot is different than the first slot;
      identifying a second set of bits in the source register based on the second shift count and a second position, within the source register, that corresponds to the second slot of the plurality of slots in the output register, wherein the second set of bits is different than the first set of bits;
      moving the second set of bits into the second slot of the plurality of slots in the output register.

11. The one or more storage media of claim 10, wherein:
   the plurality of source elements in the source register are packed versions of unpacked data elements in the output register;
   each output element in the output register is larger in size than a corresponding element of the plurality of source elements.

12. The one or more storage media of claim 10, wherein:
   each source element of the plurality of source elements in the source register is of a particular size;
   each output element in the output register is smaller than the particular size.

13. The one or more storage media of claim 10, wherein the instructions, when executed by the one or more processors, further cause:
   storing mask data in a mask register;
   after executing the shift instruction, executing an AND instruction that (a) takes, as input, contents of the output register and contents of the mask register (b) and causes a result of execution of the AND instruction to be stored in a second output register;
   causing the result to be stored in memory.

14. The one or more storage media of claim 10, wherein the plurality of source elements are from an input source that includes a set of elements, each of which is of a same particular size.

15. The one or more storage media of claim 14, wherein the plurality of source elements are a first plurality of source elements, wherein executing the shift instruction is performed at a first time, wherein the instructions, when executed by the one or more processors, further cause, after executing the shift instruction:
   storing, in a second source register, a second plurality of source elements that are from the input source and that are different than the first plurality of source elements;
   after storing the second plurality of source elements in the second source register, executing, at a second time that is after the first time, the shift instruction that takes, as input, contents of the second source register and contents of the shift count register;
   wherein the contents of the shift count register at the second time are the same as the contents of the shift count register at the first time;
   wherein executing the shift instruction at the second time causes, for each slot of a second plurality of slots in a second output register:
      identifying, in the shift count register, a certain shift count that corresponds to said each slot of the second plurality of slots;
      identifying a second set of bits in the second source register based on the certain shift count and a certain position, within the second source register, that corresponds to said each slot of the second plurality of slots;
      moving the second set of bits from the second source register into said each slot of the second plurality of slots.

16. The one or more storage media of claim 10, wherein a first element of the plurality of source elements and a second element of the plurality of source elements are on different non-byte boundaries.

17. The one or more storage media of claim 16, wherein the plurality of shift counts are a first plurality of shift counts and the plurality of source elements are a first plurality of source elements, wherein executing the shift instruction is performed at a first time, wherein the instructions, when executed by the one or more processors, further cause, after executing the shift instruction:
   storing, in a second shift count register, a second plurality of shift counts that are different than the first plurality of shift counts;
   storing, in a second source register, a second plurality of source elements that are different than the first plurality of source elements;
   after storing the second plurality of source elements in the second source register, executing the shift instruction at a second time;
   wherein executing the shift instruction at the second time causes, for each slot of a second plurality of slots in a second output register:
      identifying, in the second shift count register, a certain shift count that corresponds to said slot of the second plurality of slots;
      identifying a second set of bits in the second source register based on the certain shift count and a certain position, within the second source register, that corresponds to said each slot of the second plurality of slots;
      moving the second set of bits from the second source register into said each slot of the second plurality of slots.

18. The one or more storage media of claim 17, wherein the instructions, when executed by the one or more processors, further cause:
   storing first mask data in a first mask register;
   after executing the shift instruction at the first time, executing, at a third time, an AND instruction that takes, as input, contents of the output register and the first mask register;
   wherein the output register includes a first plurality of shifted elements, each of which corresponds to a different element of the first plurality of source elements;

wherein executing the AND instruction at the third time causes the first mask data to be applied to the first plurality of shifted elements;

storing, in a second mask register, second mask data that is different than the first mask data;

after executing the shift instruction at the second time, executing, at a fourth time that is after the third time, the AND instruction, which takes, as input, contents of the second output register and contents of the second mask register;

wherein the second output register includes a second plurality of shifted elements, each of which corresponds to a different element of the second plurality of source elements;

wherein executing the AND instruction at the fourth time causes the second mask data to be applied to the second plurality of shifted elements.

19. An apparatus comprising:
a source register that stores a plurality of source elements;
an output register;
a shift count register that stores a plurality of shift counts, each of which corresponds to a set of bits in the output register;
one or more storage media that stores a shift instruction that takes, as input, contents of the source register and contents of the shift count register;
one or more processors that are configured to execute the shift instruction;
wherein executing the shift instruction causes:
  identifying, in the shift count register, a first shift count that corresponds to a first slot of a plurality of slots in the output register;
  identifying a first set of bits in the source register based on the first shift count and a first position, within the source register, that corresponds to the first slot of the plurality of slots in the output register;
  moving the first set of bits into the first slot of the plurality of slots in the output register;
  identifying, in the shift count register, a second shift count that corresponds to a second slot of the plurality of slots in the output register, wherein the second slot is different than the first slot;
  identifying a second set of bits in the source register based on the second shift count and a second position, within the source register, that corresponds to the second slot of the plurality of slots in the output register, wherein the second set of bits is different than the first set of bits;
  moving the second set of bits into the second slot of the plurality of slots in the output register.

20. The apparatus of claim 19, wherein:
the plurality of source elements in the source register are packed versions of unpacked data elements in the output register;
each output element in the output register is larger in size than a corresponding element of the plurality of source elements.

21. The apparatus of claim 19, wherein:
each source element of the plurality of source elements in the source register is of a particular size;
each output element in the output register is smaller than the particular size.

22. The apparatus of claim 19, further comprising:
a mask register that stores mask data;
wherein the one or more processors are configured to, after executing the shift instruction:
  execute an AND instruction that (a) takes, as input, contents of the output register and contents of the mask register (b) and causes a result of execution of the AND instruction to be stored in a second output register;
  cause the result to be stored in memory.

23. The apparatus of claim 19, wherein the plurality of source elements are from an input source that includes a set of elements, each of which is of a same particular size.

24. The apparatus of claim 23, wherein the plurality of source elements are a first plurality of source elements, wherein executing the shift instruction is performed at a first time, the apparatus further comprising:
a second source register that stores a second plurality of source elements that are from the input source and that are different than the first plurality of source elements;
wherein the one or more processors are configured to, after the second plurality of source elements are stored in the second source register, execute, at a second time that is after the first time, the shift instruction that takes, as input, contents of the second source register and contents of the shift count register;
wherein the contents of the shift count register at the second time are the same as the contents of the shift count register at the first time;
wherein executing the shift instruction at the second time causes, for each slot of a second plurality of slots in a second output register:
  identifying, in the shift count register, a certain shift count that corresponds to said each slot of the second plurality of slots;
  identifying a second set of bits in the second source register based on the certain shift count and a certain position, within the second source register, that corresponds to said each slot of the second plurality of slots;
  moving the second set of bits from the second source register into said each slot of the second plurality of slots.

25. The apparatus of claim 19, wherein a first element of the plurality of source elements and a second element of the plurality of source elements are on different non-byte boundaries.

* * * * *